UNIVERSAL TV AND FM ANTENNA

Filed Feb. 5, 1958 3 Sheets-Sheet 1

Inventor
JOHN R. WINEGARD
By Frost and Verhoeven
Attorneys

UNIVERSAL TV AND FM ANTENNA

Inventor
JOHN R. WINEGARD
By Frost and Verhoeven
Attorneys

Oct. 31, 1961 J. R. WINEGARD 3,007,167

UNIVERSAL TV AND FM ANTENNA

Filed Feb. 5, 1958 3 Sheets-Sheet 3

Inventor
JOHN R. WINEGARD
By Frost and Verhoeven
Attorneys

United States Patent Office 3,007,167
Patented Oct. 31, 1961

3,007,167

UNIVERSAL TV AND FM ANTENNA

John R. Winegard, Burlington, Iowa, assignor to Winegard Company, Burlington, Iowa, a corporation of Iowa Filed Feb. 5, 1958, Ser. No. 713,426
6 Claims. (Cl. 343—803)

My invention relates to an improved universal television and FM antenna suitable for reception in both the very-high frequency and the ultra-high frequency television band and the frequency modulation band.

Current television frequencies assigned by the Federal Communication Commission are divided between the very-high frequency band—comprising a low frequency portion running from 58 to 88 megacycles and a high frequency portion running from 174 to 216 megacycles—and the ultra-high frequency band which includes a continuous range from 470 megacycles to 890 megacycles. This very wide frequency range of over 10 to 1 as measured from the lowest frequency to the highest frequency imposes severe requirements upon any antenna intended for reception in all of the frequencies. In accordance with the present invention such an antenna is provided by interleaving a coplanar in-line ultra-high frequency antenna with a coplanar in-line very-high frequency antenna and by so interconnecting and arranging the elements that in the ultra-high frequency range the ultra-high frequency elements operate with no significant interference from the very-high frequency elements and in the very-high frequency range the ultra-high frequency elements either contribute to the gain or at least do not reduce the gain. In addition, the antenna provides similar directivity characteristics over the entire range of operation and is effective in the frequency modulation frequency band (88–108 mc.).

It is therefore a general object of the present invention to provide an improved antenna capable of receiving both in the very-high frequency and ultra-high frequency television bands.

A further object of the present invention is to provide an improved antenna suitable for both the very-high frequency and ultra-high frequency television bands which utilizes an ultra-high frequency antenna which is coplanar, aligned, and interleaved with a very-high frequency antenna.

Another object of the present invention is to provide an antenna of the above type having a generally uniform directivity pattern throughout its operating range.

Still another object of the present invention is to provide an improved television antenna suitable for both the very-high frequency band and the ultra-high frequency band in which the elements are so designed that the ultra-high frequency elements contribute to the gain of the very-high frequency elements, or at least do not prejudice that gain, and the very-high frequency elements do not interfere with the performance of the ultra-high frequency elements.

Yet another object of the present invention is to provide an improved antenna for both very-high frequency and ultra-high frequency reception which is characterized by features of construction, combination, and arrangement that permits the antenna to be folded to a compact, easily shipped, unit, provides high quality performance, achieves an attractive structure having low wind resistance, ease of maintenance, and ease of installation, and is otherwise highly suitable for domestic television reception.

It is yet another object of the present invention to provide an improved television antenna for the very-high frequency and ultra-high frequency bands which utilizes elements located both above and below the boom in such fashion that a maximum degree of foldability is achieved and there is minimum interference between the respective elements either in the operating or in the folded condition.

The novel features which I believe to be characteristic of my invention are set forth with particularity in the appended claims. My invention itself, together with further objects and advantages thereof, will best be understood by reference to the following description taken in conjunction with the accompanying drawings in which:

Figures 1, 2, 5, 7, 8, 15:
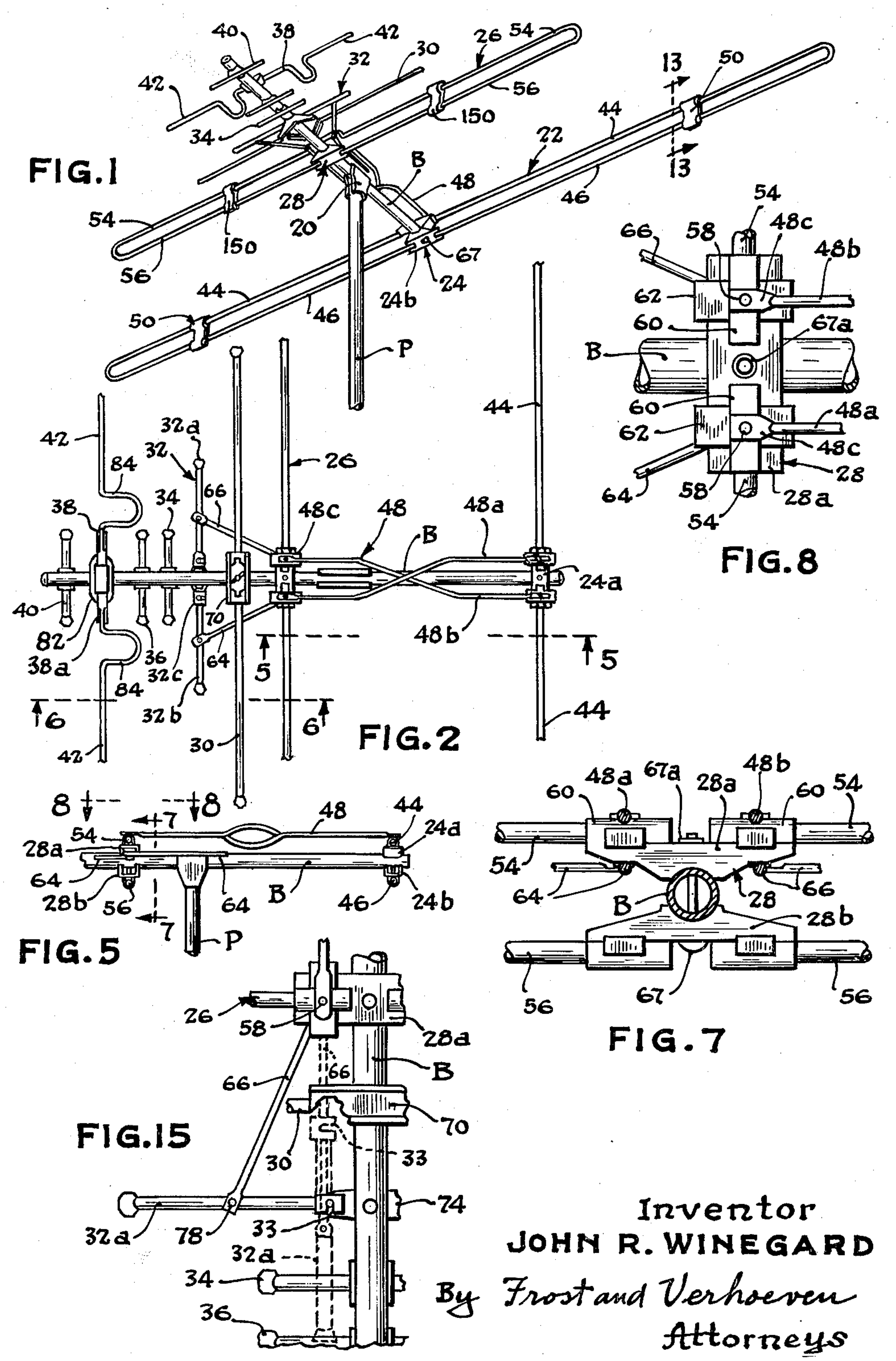
FIGURE 1 is a view in perspective from the under side of a complete antenna constructed in accordance with the present invention.
FIGURE 2 is a top plan view with parts broken away of the antenna of FIGURE 1.
FIGURE 5 is a fragmentary view in cross-section through axis 5—5, FIGURE 2.
FIGURE 7 is an enlarged fragmentary cross-section view through axis 7—7, FIGURE 5.
FIGURE 8 is a somewhat enlarged fragmentary view along axis 8—8, FIGURE 5.

FIGURE 15 is a top plan view of a fragmentary portion of the boom with the ultra-high frequency driven element in operating position in solid lines and in folded position in dotted lines; and FIGURES 16*a*, 16*b*, 16*c*, 16*d* are schematic representations of the directivity pattern of the antenna in the frequency range of channels 2 to 6, in the frequency modulation range, in the frequency range of channels 7 to 13, and in the frequency range of channels 14 to 83, respectively.

As shown in FIGURE 1 the antenna includes a boom B which is horizontally supported by the support post P through the medium of the mounting clamp 20. The support post P is held in erect vertical position by suitable means (not shown). At the aft, or rear, end of the boom B the rear very-high frequency folded dipole, indicated generally at 22, is mounted. As hereinafter described in detail, this dipole is carried on the boom by the support bracket 24. Forwardly of the dipole 22 there is provided a similar, but shorter, dipole 26 which also serves as part of the very-high frequency driven element. This dipole is supported by the bracket 28 as is hereinafter described in detail. Immediately forward of the dipole 26, there is provided a unitary element 30 which, as is hereinafter described in detail, serves as a director in the very-high frequency band and as a reflector in the ultra-high frequency band. Immediately forwardly of this element there is provided an ultra-high frequency dipole indicated generally at 32 and described in further detail hereafter. Forwardly of the ultra-high frequency dipole 32 there are provided a series of four ultra-high frequency directors indicated at 34, 36 (FIGURE 2), 38, and 40. A pair of additional elements 42 are located outboard the ends of the director 38 as is hereinafter described in further detail.

Figure 13:
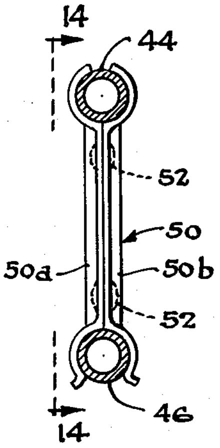
FIGURE 13 is an enlarged view in cross-section along axis 13—13, FIGURE 1.

The specific construction of the long or rear dipole 22 is best seen from FIGURES 1, 2, 5, 13, and 14. It will be observed from these figures that this dipole consists of a pair of upper arms 44 which are insulatingly supported from the boom B by the upper insulating portion 24*a* of the support bracket 24. These arms extend outwardly and are folded back upon themselves to form the spaced parallel portions 46, FIGURE 1, which are affixed at their inboard ends to the conducting lower part 24*b* of the support bracket 24. It will be observed that the construction thus formed is a folded dipole in which the inboard ends of the arms 44 provide the insulated terminals to which the transmission line 48 is connected as hereinafter described in detail. Somewhat inboard the ends of the arms 44 and 46, there are provided the connecting vertical bars 50 which are shown in detail in FIGURES 13 and 14. These bars are formed by a pair of complementary mating sheet aluminum members 50*a* and 50*b* which are secured together by the rivets 52 to clamp the arms 44 and 46, as shown in FIGURE 13, and thereby establish a conducting bridge between these arms.

It has been found that the connectors 50 serve to increase considerably the response of the unit 22 in the high frequency portion of the very-high frequency band, without reducing the response of this unit in the low frequency portion of the very-high frequency band.

The dipole unit 26 is constructed like the unit 22 except that its dimensions are somewhat shorter than those of the unit 22. That is, the unit 26 includes a pair of top arm members 54 which are supported by the insulating top portion 28*a* of the saddle assembly 28 and extend outwardly and down to form the parallel lower portions 56 which terminate as shown in FIGURE 7 in the conducting bottom portion 28*b* of the saddle 28. The portions 54 and 56 are connected together by conducting connectors 150 which are of the same construction as the conducting connectors 50 used on the dipole unit 22.

The dipoles 22 and 26 are mounted in coplanar aligned relation as shown in FIGURE 1 and are connected together by the transmission line indicated generally at 48. This transmission line is defined by conductors 48*a* and 48*b* which are preferably aluminum rod. These conductors terminate in flattened end portions 48*c*, FIGURE 8, which receive the rivets 58, FIGURE 8. The rivets 58 extend through the support sleeve 60 located at the inboard end of each of the arms defining the dipoles 22 and 26, the snap members 62 which overlay the edges of the support brackets to anchor the arms in operating position, and the insulating support bracket 28*a*, or 24*a* (FIGURE 2), as the case may be. In the case of the forward dipole 26, the rivets 58 extend through and make electrical contact with the conductors 64 and 66, FIGURE 7, which define a transmission line as hereinafter described in further detail.

As will be seen from FIGURE 7, the saddle bracket units 24 and 28 each consist of an insulating upper portion, 24*a* or 28*a*, and a conducting lower portion 24*b* or 28*b*. The anchoring rivet 67 extends through the boom 8, the washer 67*a*, FIGURE 7, and these brackets and is headed at both ends to secure the brackets in straddling clamping relationship to the boom.

Forwardly of the dipole 26 there is provided a director unit 30 which is cut to length to cause director action near the high frequency end of the very-high frequency band, that is, approximately 200 megacycles. This director unit consists of a unitary bar of aluminum which is affixed cross-wise of the boom in centered relationship by the bracket 70, FIGURES 2, 6, and 12. This bracket is defined by a conducting saddle 70*a*, FIGURES 6 and 12, a U-shaped anchoring strap 70*b* which has a comparatively wide central portion to receive the anchoring bolt 70*c*, and a pair of depending arms 70*d* which extend downwardly through the saddle 70*a* and through the arm 30, and a thumbscrew 70*e* which is threadedly received on the bolt 70*c* to draw the parts tightly together. At its opposite end, the bolt 70*c* has the portion 70*f* which supports the insulating block 70*g* which serves to carry the transmission line 72, FIGURE 6, leading to the antenna, if desired.

Figure 11:
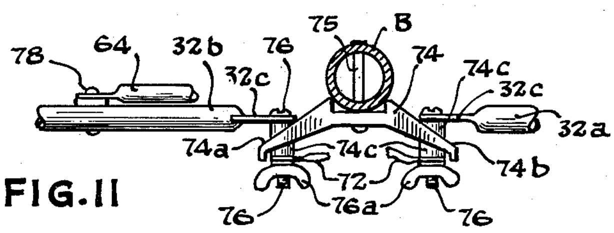
FIGURE 11 is a fragmentary cross-section view along axis 11—11, FIGURE 6.
Figures 12, 14:
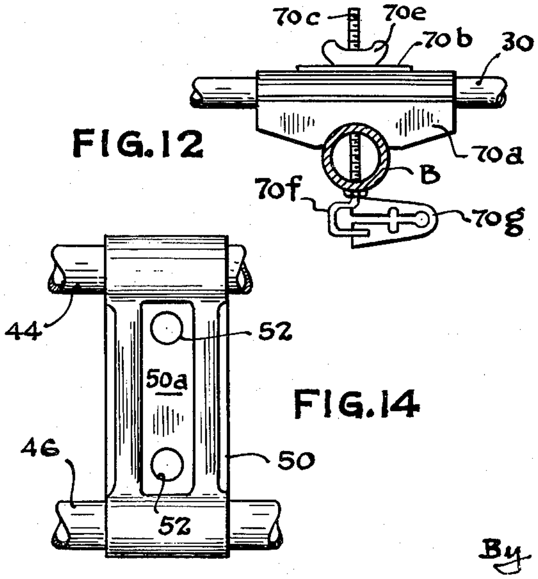
FIGURE 12 is a fragmentary view in cross-section through axis 12—12, FIGURE 6.
FIGURE 14 is a fragmentary cross-sectional view along axis 14—14, FIGURE 13.

The ultra-high frequency dipole 32 is located forwardly of the director 30. This dipole consists of two arms, 32*a* and 32*b*, which are removably secured to the insulating support bracket 74. As shown in FIGURE 11, this bracket is secured to the boom B by the lengthy rivet 75 and has ears 74*a* and 74*b* extending outwardly and downwardly. Near their ends, these ears define vertical insulating sleeves 74*c*, which in turn receive the bolts 76 and the thumb nuts, or wingnuts 76*a*. The inboard ends of arms 32*a* and 32*b* terminate in the flattened pads 32*c*, FIGURES 2 and 11, which have elongated slots 33 extending to their sides and adapted to be received under the heads of the bolts 76, FIGURE 11.

The transmission line conductors 64 and 66, FIGURES 2, 7, 8, and 11 are secured to the arms 32*b* and 32*a*, respectively, by the rivets 78. Since these transmission line conductors are thereby pivotally connected at their forward ends to the arms 32*a* and 32*b*, and at their rear ends are pivotally connected by the rivets 58 to the upper portion 28*a* of the bracket 28, these transmission line conductors are free to swing against the boom B as shown in FIGURE 15 for folding the antenna. As shown in FIGURE 15, each conductor 64 and 66 is swung about the axis defined by the corresponding rivet to the position parallel to and closely spaced from the boom B. At the same time, each arm 32*a* and 32*b* is swung out from under the bolt 76 and about the axis of rivet 78 to parallel underlying position in relation to the arm 64 or 66. These parts are shown in folded position by the dashed lines of FIGURE 15. It will be further observed from FIGURES 6, 11 and 15 that these parts fold against the boom B somewhat below the vertical center line of the boom and yet above the level of directors 34 and 36, so that the folding action may take place without interference from or interference with the other parts of the antenna.

Figure 6:
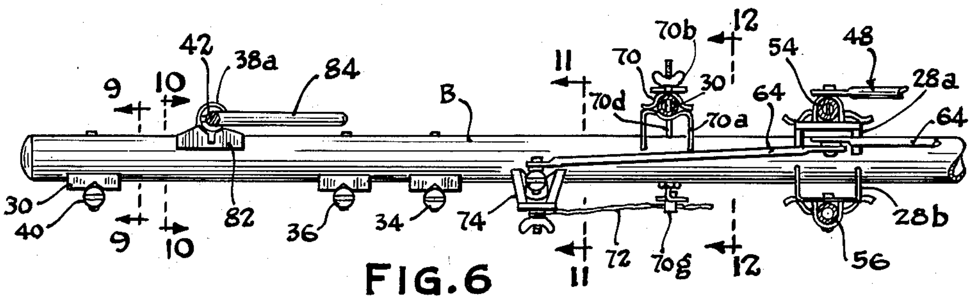
FIGURE 6 is a similar view in cross-section along axis 6—6, FIGURE 2.

Rearwardly of the rivets 58, the transmission line conductors 64 and 66 extend in an amount sufficient to define a quarter wave open transmission line near the low frequency end of the ultra-high frequency band. This construction is shown in FIGURES 1, 5, and 6. It will be further noted that the conductors 64 and 66 extend from the top edge of the dipole arms 32*a* and 32*b* in an upwardly sloping configuration, shown in FIGURE 6, to the underside of the upper insulating bracket 28*a*. It will be noted further that by this construction these conductors do not vertically interfere with the director 30 when the unit is in assembled relation and, moreover, when the unit is collapsed for shipment, the arms 32*a* and 32*b*, as well as conductors 64 and 66, are in an intermediate straddling position where they do not interfere with the directors 30, 34, or 36.

Figure 9:
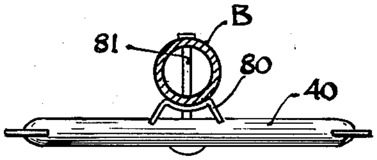
FIGURE 9 is a fragmentary view along axis 9—9, FIGURE 6.
Figure 10:
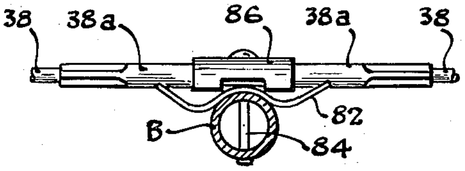
FIGURE 10 is a fragmentary view along axis 10—10, FIGURE 6.

The directors 34, 36, and 40 are of identical construction and are mounted on the underside of the boom B forwardly of the driven element 32 as shown in FIGURES 1, 2, and 6. The mounting of the directors is shown in detail in FIGURE 9. As shown, each of these directors is carried by a conducting saddle bracket 80 and is secured to the boom through the medium of this bracket by a rivet 81.

The ultra-high frequency band director 38 is located on the top of the boom and is secured to the top of the boom through the medium of the conducting saddle bracket 82 which bears against the under side of the sleeve 38*a* forming the inboard portions of this director. The sleeve 38*a* is secured in position by the rivet 84 which seats against the cap 86 extending over the sleeve 38, and passes through this cap, sleeve 38a, saddle bracket 82 and the boom B to secure the entire unit in assembled relationship.

The director portions 42 are located outboard the director 38 and are secured thereto by the couplers 84. Each of these couplers is defined by a U-shaped transmission line having high impedance in the ultra-high frequency band so that in the ultra-high frequency band the director portions 38 and 42 are effectively disconnected. The effective ultra-high frequency directors are 34, 36, 38, and 40, each of which is in effective directing relationship to the ultra-high frequency driven element 32. In the very-high frequency band the impedance of the couplers 84 is relatively small and these couplers coact with the portions 42 to define a unit of effective electrical length sufficient to serve as a director in the very-high frequency band.

The transmission line leading to the receiver is indicated at 72, FIGURES 6 and 11. As shown in these figures, this transmission line is connected to the bolts 76 which in turn define a connection to the inboard end of the ultra-high frequency dipole 32.

An antenna constructed with the following dimensions would come within the scope of the present invention although it will be understood that the invention is not limited to antennas constructed with these dimensions:

| | Inches |
|---|---|
| Longitudinal distance from dipole 22 to dipole 26 | 15 |
| Longitudinal distance from dipole 26 to director 30 | 2¾ |
| Longitudinal distance from director 30 to dipole 32 | 2½ |
| Longitudinal distance from dipole 32 to director 34 | 2 |
| Longitudinal distance from director 34 to director 36 | 1½ |
| Longitudinal distance from director 36 to director 38 | 2⅛ |
| Longitudinal distance from director 38 to director 40 | 2⅛ |
| Overall reach of dipole 22 | 86⅞ |
| Distance between connectors 50 on dipole 22 | 58¼ |
| Overall reach of dipole 26 | 54 |
| Distance between connectors 150 on dipole 26 | 23¼ |
| Overall reach of director 30 | 27½ |
| Overall reach of dipole 32 | 13½ |
| Overall reach of director 34 | 5⅝ |
| Overall reach of director 36 | 5⅝ |
| Overall reach of director 38 | 6⅛ |
| Overall reach of director 40 | 5⅝ |
| Length of each element 42 | 5⅞ |
| Length of each transmission line 64 and 66 between dipole 32 and dipole 26 | 5¾ |
| Length of each transmission line 64 and 66 to the rear of dipole 26 | 5¾ |
| Distance from each end of dipole 32 to transmission line 64 and 66, respectively | 3 |
| Diameter of dipole 22 | ⅜ |
| Diameter of dipole 26 | ⅜ |
| Diameter of director 30 | ⅜ |
| Diameter of dipole 32 | ⅜ |
| Diameter of director 34 | ⅜ |
| Diameter of director 36 | ⅜ |
| Diameter of director 38 | ⅜ |
| Diameter of director 40 | ⅜ |
| Diameter of element 42 | 3/16 |
| Diameter of transmission lines 64 and 66 | 3/16 |
| Diameter of transmission lines 48a and 48b | 3/16 |

Figures 3, 4, 16A, 16B, 16C, 16D:
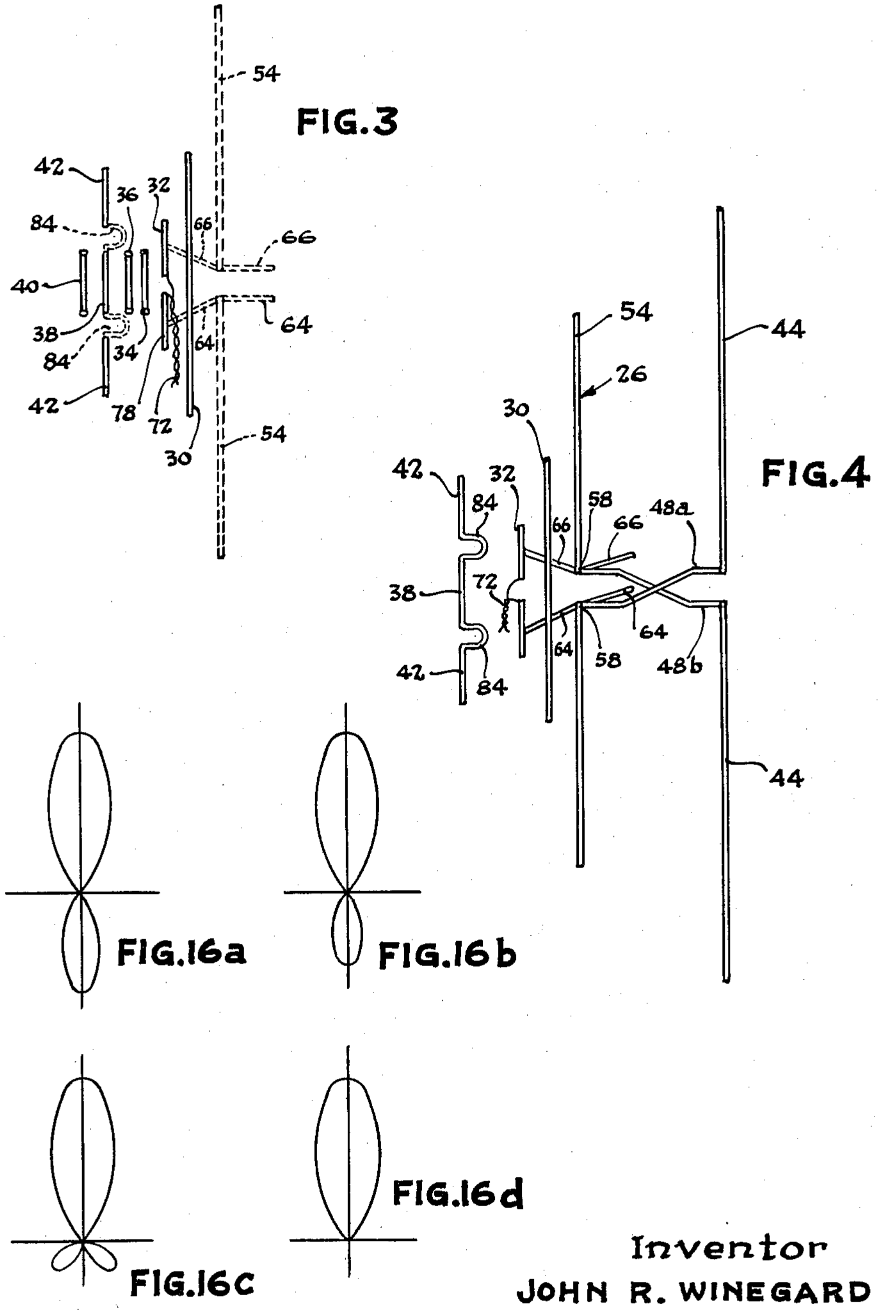
FIGURE 3 is a somewhat diagrammatic view showing the operating elements of the antenna of FIGURES 1 and 2 when operating in the ultra-high frequency band.
FIGURE 4 is a view like FIGURE 3 but showing the operating elements when operating in the very-high frequency television band.

The operation of the antenna of the present invention is best understood by reference to FIGURES 3 and 4. In FIGURE 3, the important elements of the antenna for ultra-high frequency band operation are shown, whereas in FIGURE 4 the important elements for very-high frequency band operation are indicated.

As shown in FIGURE 3, the effective directors for ultra-high frequency band operation are the directors 40, 38, 36, and 34. These are of length to serve as directors and are located forwardly of and in coplanar aligned relationship with the ultra-high frequency dipole driven element 32. The director 30, being of length considerably in excess of the driven element 32, serves as a reflector to increase further the signal level at the driven element 32. In the ultra-high frequency band the director elements 42 have very little effect because they are effectively disconnected by the coupler units 84 from the director portion 38. Since the transmission line 72 is connected directly to the dipole 32, signals at the dipole 32 are transmitted to the transmission line 72 and thence to the receiver.

The transmission line conductors 64 and 66, the dipole elements 54, and other portions of the very high frequency driven elements are shown in dotted lines in FIGURE 3. This is because these elements are not active with respect to the dipole 32 because they represent at the low frequency end of the ultra-high frequency band—a very high impedance at the dipole 32. This is due to the fact that the open-ended transmission line defined by the portions of conductors 64 and 66 behind the dipole arms 54, FIGURE 3 are approximately one-fourth wave length in length near the low end of the ultra-high frequency band, thereby defining a very low impedance and thus causing the portions of conductors 64 and 66 forward of the arms 54 to act as if terminated in a very low impedance. Additionally, the length of the transmission line defined by conductors 64 and 66 forward of the arms 54 and extending between the driven element 32 and the dipole arms 54, is approximately one-fourth wave length near the low end of the ultra-high frequency band, so that the dipole arms 32a and 32b, or, more accurately, the rivets 78, are connected together by a transmission line system that in general effect amounts to a quarter wave short circuited line and has a very high impedance in the low end of the ultra-high frequency band and hence has no substantial effect in reducing the gain of the driven element 32.

At the high frequency end of the ultra-high frequency band, the frequency (890 mc.) is about twice the frequency at the low frequency end (470 mc.). Consequently, at the high frequency end of the band the driven element 32 acts as a full wave dipole. That is, each of the arms of the driven element 32 has a full voltage wave, with a minimum voltage point at the center of each of the arms. When the dipole is so acting, the transmission line conductors 64 and 66 are connected to the dipole 32 at points of very low potential and it is unimportant to effective operation of the antenna that there be some connection between these points. For this reason the driven element 32 operates effectively at the high end of the ultra-high frequency band even though the elements 64 and 66 reflect some varying impedances at their points of connection to the driven element 32.

The above operation of driven element 32 is described in further detail in my copending patent application, serial No. 713,427, filed February 5, 1958, now U.S. Patent No. 2,992,430, entitled TV Antenna Driven Element, assigned to the same assignee as the present invention. The driven element per se is claimed in that application.

In the very-high frequency band the operation of the antenna is defined by the portions of the structure shown in FIGURE 4. In this instance, the transmission line 72 is connected through the medium of driven element 32 and the transmission line defined by conductors 66 and 64 to the inboard ends of the driven element 54. Since the driven element 32 is of small size in relation to the very-high frequency wave lengths, as is the transmission line defined by conductors 64 and 66, the net effect is the same as if the transmission line 72 were connected directly to the rivets 58. In the very-high frequency band the director 30 is of length to operate effectively as a director to increase the gain of the antenna, particularly at the high frequency end of the very-high frequency band. Similar director action is achieved by the director elements 38 and 42, together with the couplers 84, which provide a unit of electrical length serving to operate as a director in the high frequency end of the very-high frequency band, thereby further increasing the gain.

FIGURES 16*a* to 16*d*, inclusive, show approximately the directivity patterns of the antenna throughout its intended operating range. It will be noted that in each instance the major lobe is of about the same configuration—that is with an included angle of about 50 degrees—and is in the same direction in relation to the antenna. Of course there are minor lobes, but in each instance these are of relatively low response and do not interfere with the basic functioning of the major lobe. FIGURES 16*a* to 16*d* are representative of the results of tests made at various frequencies in the indicated ranges, FIGURE 16*a* covering the frequency range of channels 2 to 6, FIGURE 16*b* covering the frequency modulation frequency range, FIGURE 16*c* covering channels 7 to 13, and FIGURE 16*d* covering channels 14 to 83. Experience with the antenna indicates that these are the effective directivity patterns at all frequencies within the indicated ranges, although some variations undoubtedly do occur.

One of the distinctive features of the present invention is that it provides a completely universal antenna suitable for use in areas of medium signal intensity. It has a practical and effective—and constant—directivity pattern throughout the entire high and ultra-high frequency television frequency range, as well as the FM frequency range. It can be sold to customers with an assurance that whatever the frequencies of the local stations the antenna will operate effectively and give good reception. This is a highly desirable feature as it renders unnecessary the special design of antennas to accommodate the particular frequencies used in specific areas, with the incident problems of special orders, inventory, delivery delays, and the like. It is further desirable because the antenna can be sold with confidence by the dealer even though he may have no specific knowledge of the place of ultimate antenna installation.

In the above description, and in the accompanying claims, positions of elements have been described as forward or behind each other in accordance with whether the elements are forward or behind with respect to the direction of the received waves. In the antenna, it will be observed, the response is greatest to incident waves coming from the lefthand direction as seen in FIGURE 2 and waves coming from the opposite direction are received with considerably less gain due to the director action and the reflector action of the various parts as described above.

While I have shown and described a specific embodiment of the present invention it, will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States is:

1. A planar in-line antenna for reception in both the very-high and ultra-high frequency television bands, comprising in combination: a dipole driven element suitable for very-high frequency reception; a first director tuned to the high frequency end of the very-high frequency band and located adjacent to and in line with the driven element; a second director located forwardly of the first director and comprising three colinear sections, each approximately one half wave in length in the ultra-high frequency band and joined by coupling units resonant in the ultra-high frequency band, whereby in the ultra-high frequency band the three sections operate as if insulated and the center section serves as a director; a dipole driven element having a pair of arms and adapted for ultra-high frequency reception located between said first and second directors in in-line coplanar relation thereto; a converging transmission line extending from approximately the midpoints of the arms of the last driven element to the inboard ends of the first driven element; said transmission line being about a quarter wave in length at the low frequency end of the ultra high frequency band; a resonant impedance element connected to the inboard ends of the first driven element and reflecting a low impedance at the low frequency end of the ultra high frequency band; and a transmission line connected to the inboard ends of the last driven element.

2. A planar in-line antenna for reception in both the very-high and ultra-high frequency television bands, comprising in combination: a dipole driven element suitable for very-high frequency reception; a first director tuned to the high frequency end of the very-high frequency band and located adjacent to and in line with the driven element; a second director located forwardly of the first director and comprising three colinear sections, each approximately one half wave in length in the ultra-high frequency band and joined by coupling units resonant in the ultra-high frequency band, whereby in the ultra-high frequency band the three sections operate as if insulated and the center section serves as a director; a dipole driven element having a pair of arms of about one quarter wave length at the low frequency end of the ultra-high frequency band and located between said first and second directors in in-line coplanar relation thereto; and a converging transmission line extending from approximately the midpoints of the arms of the last driven element to the inboard ends of the first driven element, said transmission line being about a quarter wave in length at the low frequency end of the ultra high frequency band; and a stub transmission line connected to the inboard ends of the first driven element and reflecting a low impedance at the low frequency end of the ultra high frequency band.

3. A planar in-line antenna for reception in both the very-high and ultra-high frequency television bands, comprising in combination: a first dipole driven element suitable for very-high frequency reception and having a pair of feed points; a first director tuned to the high frequency end of the very-high frequency band and located adjacent to and in line with the driven element; a second director located forwardly of the first director and comprising three colinear sections, each approximately one half wave in length in the ultra-high frequency band and joined by coupling units resonant in the ultra-high frequency band, whereby in the ultra-high frequency band the three sections operate as if insulated and the center section serves as a director; a second dipole driven element having arms of about one quarter wave length at the low frequency end of the high frequency band located between said first and second directors in in-line coplanar relation thereto; transmission line elements connecting the mid-portions of the arms of the second dipole element to the feed points of the first dipole element and of about one quarter wave length at the low frequency end of the ultra high frequency band; and a stud transmission line connected to the feed points of the first dipole element and reflecting a low impedance at the low frequency end of the ultra high frequency band.

4. A television antenna for both the very-high and ultra-high frequency bands comprising in combination: a plurality of coplanar in-line ultra-high frequency directors; an ultra-high frequency dipole driven element of half wave length at the low frequency end of the ultra high frequency band located in coplanar in-line relation to said directors to receive signals amplified thereby; a reflector located behind the driven element and of length to serve as a director in the very-high frequency band; at least one of the first directors having a pair of outboard wings of substantially the same length and connected thereto by elements resonant in the ultra-high frequency band, to form a director in the very-high frequency band;

and a very-high frequency driven element located behind said reflector to receive very-high frequency signals, a transmission line connecting the very-high frequency driven element to voltage node points on the ultra-high frequency driven element when operating at the high frequency end of the band and reflecting a high impedance to the ultra-high frequency driven element at the low frequency end of the band.

5. A planar in-line antenna for reception in both the very-high and ultra-high frequency television bands, comprising in combination: a dipole driven element suitable for very-high frequency reception and defined by a comparatively short forward dipole element, a comparatively longer rear dipole element, and a crossed transmission line connecting the inboard ends of the two elements; a first director tuned to the high frequency end of the very-high frequency band and located adjacent to and in line with the driven element; a second director located forwardly of the first director and comprising three colinear sections, each approximately one half wave in length in the ultra-high frequency band and joined by coupling units resonant in the ultra-high frequency band, whereby in the ultra-high frequency band the three sections operate as if insulated and the center section serves as a director; a dipole driven element having a pair of arms and adpated for ultra-high frequency reception located between said first and second directors in in-line coplanar relation thereto; and a converging transmission line extending from approximately the midpoints of the arms of the last driven element to the inboard ends of the first driven element, said transmission line being approximately one quarter wave in length at the low-frequency end of the ultra-high frequency band; and resonant impedance means defining a low impedance across the first driven element at the low-frequency end of the ultra-high frequency band.

6. A television antenna for both very-high and ultra-high frequency reception comprising in combination: a very-high frequency driven element defined by a pair of coplanar parallel folded dipole elements, one being shorter than the other, the elements being of length to respond to very-high frequency signals; a transmission line joining the inboard ends of said elements to provide response over the entire very-high frequency range; an ultra-high frequency dipole defined by a pair of colinear arms located in line and coplanar with the said driven element; a transmission line joining the arms of the ultra-high frequency dipole and the first transmission line, said last transmission line extending beyond the points of connection of the first transmission line to define a low impedance connection at the first transmission line in the ultra-high frequency band, said last transmission line being of length to reflect a high impedance in the ultra-high frequency band at the arms of the ultra-high frequency dipole, when a low impedance is present at the points of joinder with the first transmission line.

References Cited in the file of this patent

UNITED STATES PATENTS

| | | |
|---|---|---|
| 2,700,105 | Winegard | Jan. 18, 1955 |
| 2,701,308 | Kay | Feb. 1, 1955 |
| 2,705,283 | Thomas | Mar. 29, 1955 |
| 2,716,703 | Kane | Aug. 30, 1955 |
| 2,726,390 | Weiss | Dec. 6, 1955 |
| 2,772,413 | Guernsey et al. | Nov. 27, 1956 |

OTHER REFERENCES

Antennas by Kraus, McGraw-Hill Book Co., Inc., 1950, pages 418–419.